United States Patent
Monegan et al.

(10) Patent No.: US 9,712,671 B2
(45) Date of Patent: Jul. 18, 2017

(54) METHOD AND APPARATUS FOR INTENT PREDICTION AND PROACTIVE SERVICE OFFERING

(71) Applicant: 24/7 Customer, Inc., Campbell, CA (US)

(72) Inventors: Michael Monegan, Los Osos, CA (US); Samrat Baul, Union City, CA (US)

(73) Assignee: 24/7 CUSTOMER, INC., Campbell, CA (US)

( * ) Notice: Subject to any disclaimer, the term of this patent is extended or adjusted under 35 U.S.C. 154(b) by 42 days.

(21) Appl. No.: 14/829,989

(22) Filed: Aug. 19, 2015

(65) Prior Publication Data

US 2015/0358460 A1 Dec. 10, 2015

Related U.S. Application Data

(63) Continuation of application No. 13/961,675, filed on Aug. 7, 2013, now Pat. No. 9,124,694.

(60) Provisional application No. 61/680,957, filed on Aug. 8, 2012.

(51) Int. Cl.
*H04M 3/00* (2006.01)
*H04M 3/493* (2006.01)
*G06Q 30/00* (2012.01)
*H04M 3/51* (2006.01)
*H04M 3/42* (2006.01)

(52) U.S. Cl.
CPC .......... *H04M 3/493* (2013.01); *G06Q 30/016* (2013.01); *H04M 3/5166* (2013.01); *H04M 3/42068* (2013.01); *H04M 2203/2038* (2013.01); *H04M 2203/551* (2013.01)

(58) Field of Classification Search
CPC .. H04M 3/493; H04M 3/4931; H04M 3/4933; H04M 3/4935; H04M 3/4936; H04M 3/4938
USPC ........... 379/88.01, 88.22, 266.08; 705/7, 304
See application file for complete search history.

(56) References Cited

U.S. PATENT DOCUMENTS

| | | | |
|---|---|---|---|
| 8,488,774 B2 | 7/2013 | Mahalaha et al. | |
| 8,621,209 B1* | 12/2013 | Johansson | H04L 63/08 713/155 |
| 2007/0127635 A1 | 6/2007 | Zellner et al. | |
| 2007/0198368 A1 | 8/2007 | Kannan et al. | |
| 2009/0198587 A1* | 8/2009 | Wagner | G06F 21/31 705/26.1 |
| 2010/0138282 A1 | 6/2010 | Kannan et al. | |
| 2010/0191658 A1 | 7/2010 | Kannan et al. | |
| 2010/0274597 A1* | 10/2010 | Dill | G06Q 30/02 705/7.29 |
| 2013/0156170 A1* | 6/2013 | Springer | H04M 3/493 379/88.22 |

FOREIGN PATENT DOCUMENTS

WO  WO-2013090492  6/2013

* cited by examiner

*Primary Examiner* — Van D Huynh
(74) *Attorney, Agent, or Firm* — Perkins Coie LLP

(57) ABSTRACT

An intelligent IVR system identifies a customer based on previous customer interactions. Customer intent is predicted for an ongoing interaction and personalized services are proactively offered to the customer. A self-optimizing algorithm improves intent prediction, customer identity, and customer willingness to engage and use IVR.

23 Claims, 4 Drawing Sheets

METHOD AND APPARATUS FOR INTENT PREDICTION AND PROACTIVE SERVICE OFFERING

CROSS REFERENCE TO RELATED APPLICATIONS

This application is a continuation of U.S. patent application Ser. No. 13/961,675, filed Aug. 7, 2013, which claims priority to U.S. provisional patent application Ser. No. 61/680,957, filed Aug. 8, 2012, each of which applications are incorporated herein in their entirety by this reference thereto.

BACKGROUND OF THE INVENTION

Technical Field

The invention relates to field of Interactive Voice Response (IVR) technology. More particularly, the invention relates to intelligent IVR Systems having predictive technology that enhances the customer experience.

Description of the Background Art

Interactive voice response (IVR) technology is deployed between a customer and a customer care executive to automate the process of serving the customer at least in part. IVR systems are often criticized as being unhelpful and difficult to use due to their poor design and the fact that they tend to show a lack of appreciation of the customer's needs.

A properly designed IVR system should connect customers to their desired service promptly and with minimum complexity. Present IVR technology handles all customers in a "one size fits all" manner, taking the customer through a series of menus before arriving at the desired service. This makes the call time-consuming, which leads to customer frustration and which gives customers a feeling that they are facing a rigid, impersonal system. This results in a low score on customer satisfaction. Present IVR systems treat repeated calls in the same predefined manner without making any effort to know the background of recent calls, such as whether the customer just had a bad call experience and is retrying, or any similar dissatisfaction.

No effort is presently put toward understanding the exact need of the customer by providing the customer with the best suitable option, thus helping the customer to get desired information in lesser time, while enhancing the customer's experience.

It would therefore be advantageous to provide method and apparatus for intent prediction and proactive service offering.

SUMMARY OF THE INVENTION

An intelligent IVR system identifies a customer based on previous customer interactions. Customer intent is predicted for an ongoing interaction and personalized services are proactively offered to the customer. A self-optimizing algorithm improves intent prediction, customer identity, and customer willingness to engage and use IVR.

DETAILED DESCRIPTION OF THE INVENTION

Intent Prediction and Proactive Service Offering

Embodiments of the invention identify customers across multiple channels, predict customer intent, and proactively offer services to customers. In an embodiment, an automated speech self-service application framework uses data it persists, as well as enterprise data it accesses, to greet all customers and execute a personalized service strategy for each customer. This minimizes the duration of the interaction, reduces the cognitive effort needed by the customer during the call, and enhances the customer experience because the customer is treated as a known customer.

A further embodiment of the invention predicts the identity of the customer, or multiple possible candidate identities, along with a confidence factor for each identity prediction.

In another embodiment of the invention, the customer's intent is predicted to estimate the most likely action or actions that the customer wants to take in an ongoing interaction. Self optimization of prediction confidence scores allows the system to adjust itself on-the-fly and learn which assessment can be productively applied to the customer experience.

In another embodiment of the invention, one or more solicitations for service that are relevant to the customer current situation are proactively offered to the customer.

In yet another embodiment of the invention, customer tolerance is calculated to model how tolerant the customer is likely to be with regard to engaging with IVR automation in connection with completing previous tasks as directed by the IVR, thus establishing a behavioral foundation for assessing the value of attempting a subsequent IVR interaction.

Figure 1:
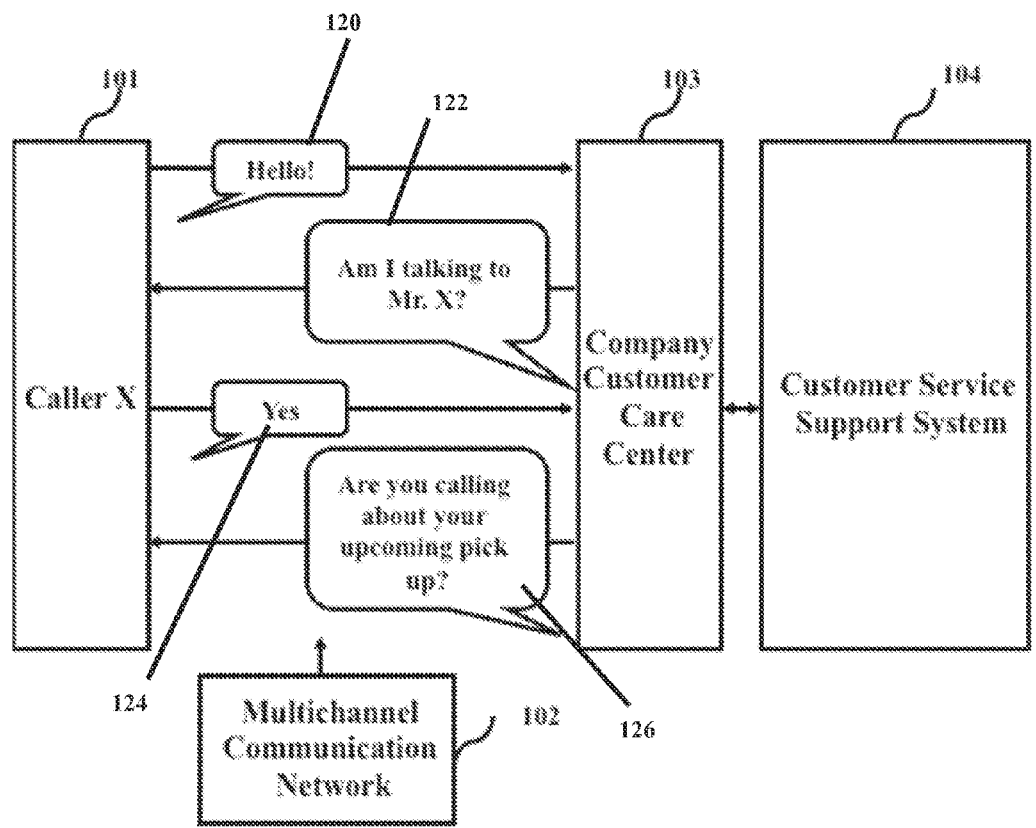
FIG. 1 is a block schematic diagram showing a system for predicting customer intent in connection with an IVR session according to the invention.

FIG. 1 is a block schematic diagram showing a system for predicting customer intent in connection with an IVR session. In FIG. 1, a caller X 101 communicates (120) via a multichannel communication network 102 with a company customer care center 103 which, in turn, communicates with a backend support system 104. The customer care center responds to the customer (122) and, upon receiving confirmation of the customer's identity (124), inquires as to the nature of the customer's interaction (126). The caller X is one among many customers who interact with the company's customer care center, each of which has a specific intention to receive a desired service or information.

The company customer care center 103 can include any of a combination of multiple customer support mechanisms, such as an IVR system, customer care executives, email support systems, SMS support systems, chat-based support systems, offline support systems, etc. Communication between the customer and the customer care center 103 may occur through a multichannel communication network 102 which may comprise any of a plurality of communication networks, such as SMS, Web, email, and outbound communication.

Figure 2:
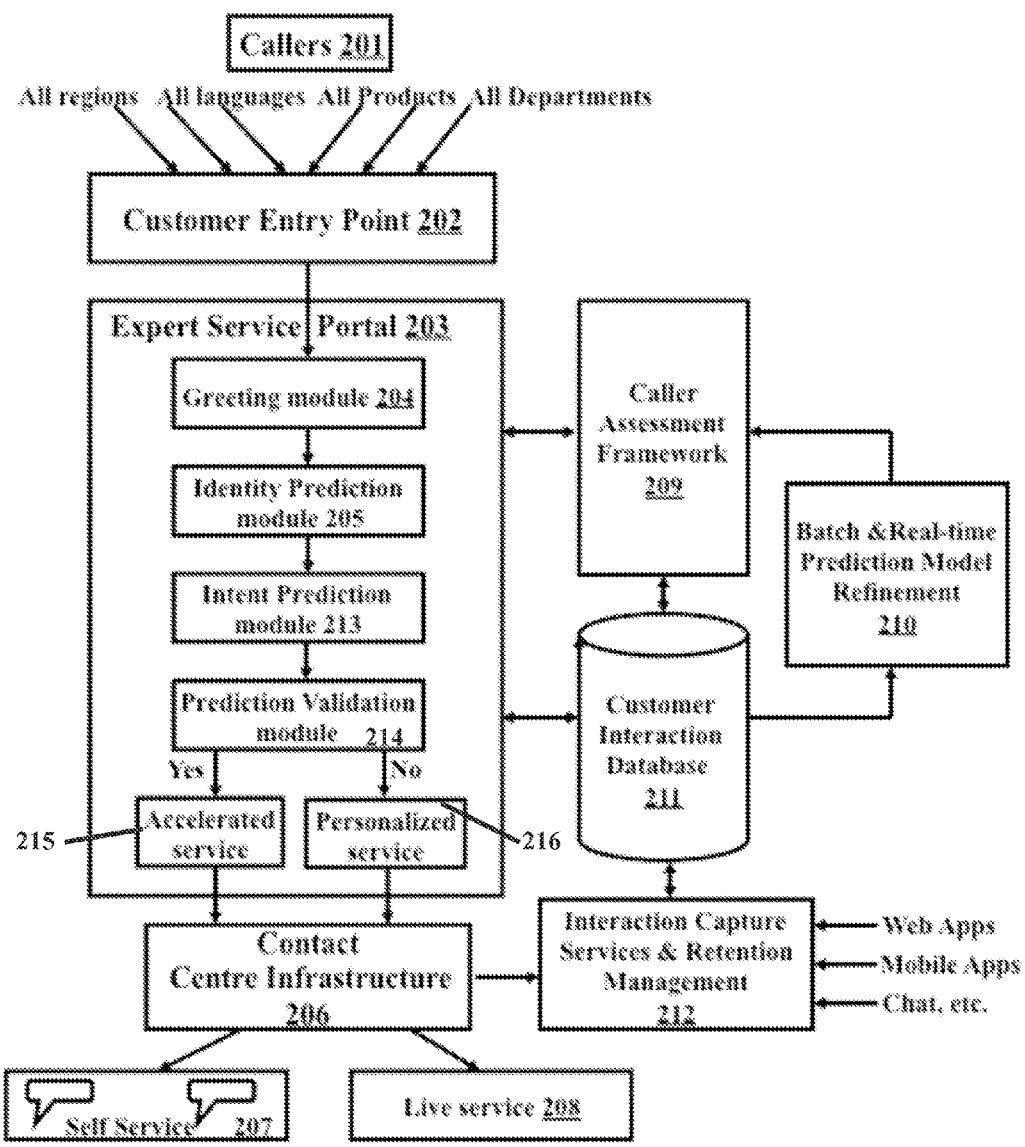
FIG. 2 is a block schematic diagram showing a system for predicting customer intent in connection with an IVR in which the logical flow of a call is shown according to the invention.

FIG. 2 is a block schematic diagram showing a system for predicting customer intent in connection with an IVR in which the logical flow of a call is shown according to the invention. The company customer care center 103 is supported by a customer service support system 104 which, in turn, comprises a plurality of logical and hardware modules, such as an expert service portal block 203, a real-time caller assessment framework 209, a customer interaction database 211 for augmenting customer data repositories, interaction capture services 212, a prediction model refinement mechanism 210, etc. These mechanisms establish an ecosystem which allows the real-time caller assessment framework and certain maintenance and data hygiene jobs in the customer interaction database to be used to make calculations within a few seconds while a generic greeting prompt, e.g. "Thanks for calling XYZ Airlines," is playing which identifies the customer, predicts the customer's intention, and minimizes the duration of the customer's interaction with the system, which thus provides enhanced customer satisfaction.

A customer entry point 202, which is in communication with the customer care center 103, interacts with customers 201 through the multichannel communication network 102. A customer 201 can be associated with different languages, regions, products, departments, etc. Interaction by a customer 201 with the customer entry point 202 is transferred to the expert service portal (ESP) 203. A greeting module 204, which is part of the ESP 203, welcomes the customer 201 and simultaneously tries to identify the customer by using the incoming phone number if the customer has interacted with the system over phone or by SMS; if, however, the customer has interacted with the system via email or offline support, then an email ID is used by the greeting module 204 to identify the customer.

Apart from identifying the customer, the greeting module determines a confidence score based on multiple factors, such as a history of previous access by the customer, previous success rate in identifying the customer, customer care executive input from an agent who interacted with a previous communication from the same phone number or email ID, an explicit opt-in action by customer that identifies the customer every time that the customer calls from the same number, call history from the same phone number, etc.

The confidence score is calculated by using a mathematical function that adds all of the scores corresponding to positive influences and subtracting from the result the scores that correspond to negative influences. For an example of how this might manifest, an event such as the customer's phone number being unique in the database is a positive event and has a corresponding score of two points. On the other hand, an event such as the same phone number looking up records of two different individuals is a negative event and can result in a subtraction of two points from the confidence score. Once the resultant confidence score goes up due to this algorithm, and crosses a predefined threshold, the caller's identity confidence is considered to be stronger. For example, the caller can move from being a low confidence caller to a medium confidence caller if the score goes above five points. The exact positive and negative influences of events on the score are tunable parameters that can be easily changed without interruption of the operations of the system. Those skilled in the art will appreciate that other values may be assigned for positive and negative influences as deemed appropriate.

In one embodiment of the invention, an identity confidence scoring mechanism develops and manages a storage mechanism in the customer interaction database 211 that contains unrestricted, many-to-many relationships between a phone number and customer IDs. This mechanism allows the correlation of a name with an ID to evolve on a continuous or discrete scale, based on inputs observed by the system, i.e. incidents. As described above, incidents are events that trigger a positive or negative impact on the confidence score calculation. This mechanism also addresses the case where phone numbers are shared by multiple customers through the use of parallel scoring and assessment of multiple IDs for an interaction, and by selective application of either an interactive disambiguation process or a sense of a personalized interaction with both identities under certain approved conditions, e.g. husband and wife, known cohabitants, etc.

If the identity confidence score is low and ambiguity exists about the customer's identity, then an identification step is performed by asking the customer his identity directly using one of a set of predefined identification data collection approaches, such as single confirmation, e.g. "Is this James calling?"; double confirmation, e.g. "Is this either Maria or James calling?"; shortlist disambiguation, e.g. "Who is calling?"; or full name capture, e.g. "Please tell me your name." If the confidence score is high, then the identify module determines the customer's identity using an identity prediction module 205 and further confirms the customer's identity based upon the customer's response to the determination. In one embodiment of the invention, the identification module uses the outcome of the current determination to further impact the confidence score in future interactions with customers having the same identity, e.g. the same phone number or email ID. In this way, the system learns over time from past interactions and improves the accuracy of the confidence score.

After the customer confirms his identity, the intent prediction module 213 uses multiple data sources to contribute to the prediction of the intent of the customer for the current interaction, as well as to offer services or promotions to the customer based on predictions made by the intent prediction module.

Such multiple data sources can include any of:
Recent transactions of calls received from the same number;
Recent SMS communications from the same number;
Recent email communications with the same customer;
Recent Web browsing and mobile devices applications sessions;
Trends and patterns of all inbound and outbound phone communications with the likely identity of the customer; and
Use of information recorded about interactions in non-phone channels, such as the call center agent, Web site, mobile application, store, direct mail, etc.

The intent prediction module helps reduce customer interaction time with the customer care center, offers personalized services, and improves customer satisfaction by exhibiting an overall sensitivity to the context of the call.

Predictions from the intent prediction module are validated using a prediction validation module 214. The caller may be asked a proactive question to capture intent, such as "Are you calling to about your upcoming trip to Boston?" If the caller says "Yes" and accepts this proactive intent, it is recorded in the database as a positive validation of the intent prediction algorithm. Thus, in one embodiment of the invention the intent prediction module not only predicts the intent of the customer, but also predicts many other aspects of the call, such as whether the customer should be provided with accelerated service 215, if the intent prediction is validated to a sufficient level of confidence, or personalized service 216, if the intent prediction is not validated to a sufficient level of confidence. This technique helps determine the optimal strategy to apply, for example via any of a contact center infrastructure 206 that invokes a self service module 207 or live service 208, e.g. for sales or services; customer interaction language; the product that customer is looking for or recently bought, e.g. car, truck, hotel; type of customer, e.g. general customer, high value customer, agent; best style to address the customer, e.g. expert, normal, verbose; next steps in the business process; etc. All of these predicted aspects are considered when devising a services strategy for the customer.

In one embodiment of the invention, the prediction model refinement module 210 implements a closed-loop prediction optimization algorithm that learns the combination of factors which most accurately predict the actual activity on an interaction. The prediction algorithm works on several data points to make the intent prediction result in a proactive offer to the caller. The data points include, for example, current activity on the client file, such as recent reservation, data from the company's CRM database, etc. In a situation where multiple intents are possible, the algorithm decides on the most likely intent based on these data points and the order in which they are to be considered.

The intent prediction module also performs a self-monitoring of the performance of the mechanism by regularly calculating a customer assessment success rate, i.e. the percentage of times a customer assessment is completed in its entirety before the conclusion of an assessment period, where the assessment period denotes the maximum amount of time available at the start of a customer interaction before the prediction results are no longer valuable.

Disparate events, either in the IVR or outside the IVR, are considered in proportion to their predictive power. When weighing such different events for a caller C, for example C had rented a car and returned it about two weeks ago (which predicts the possible desire for a receipt for C's expense report) and C requested roadside assistance one hour ago for a different rental car (which predicts additional roadside support), the relative predictive power of each of these events is evaluated using the algorithm. Positive points are awarded to factors, such as recentness of events, and negative points may be awarded to events which may not have happened recently. In the above example, the request for roadside assistance is regarded as more likely due to this evaluation, as well as the sensitive nature of potentially still having a customer stranded on the side of the road.

In one example, a customer has made a flight ticket booking in the recent past, e.g. within the last 15 days. The intent prediction module predicts that the customer's interaction relates to an enquiry about the flight and checks with the customer to see if the customer is, indeed, looking for flight ticket status.

In another example, if the intent prediction module finds data related to the customer, e.g. the customer owns a house, and if the intent prediction module predicted that the customer's current interaction intent is related to house equipment, then the system proactively offers products or services which are relevant to the customer during the current intention, e.g. insurance for the house.

In another example, if the intent prediction module finds that the customer has booked a lodging in a hotel for today's date, then offering another hotel accommodation is irrelevant. This leads the Intent prediction module to remove this kind of promotion so that customer is not annoyed by intrusive and useless information, thereby increasing customer satisfaction.

In one embodiment of the invention, the intent confidence score is also used for intent prediction and, depending on the confidence score and the intent of the customer, the system creates a services strategy for the customer, for example by directing the customer to a self help system, sending an SMS to the customer's mobile number with the necessary information that the customer is looking for, sending an email to the customer with information that customer is looking for, passing the customer to a customer care executive, directing the customer to chat support, asking the customer to go to a self help portal, scheduling a call back to the customer, etc. The system treats each customer with specialized services based on the current intent of the customer, rather than treating all customers with same standard series of menus, or treating each customer in similar way every time they interact with the system. This improves customer satisfaction and reduces the cost to a company of servicing a customer because at least some of the customer's issues are addressed without involving a customer care executive.

Embodiments of the invention also calculate caller tolerance, i.e. how tolerant the customer is likely to be to the use of IVR automation on this interaction, based on computing scores for:

(a) Prior customer efforts to use the IVR system; and
(b) Recent success rates in using the IVR system.

The assessment of the caller's tolerance for automation is based on the calculation of a score that incorporates the effect of positive and negative effects. For example, if a caller does not request the assistance of an operator, even after multiple instances of caller difficulty, it is considered a positive influence on the tolerance score. However, if a caller immediately requests operator assistance when the caller faces the first speech recognition issue, it is considered a negative influence.

In one embodiment of the invention, a customer can set certain preferences, such as permanent opt-in to, and/or opt-out of, the customer assessment and recognition process; temporary exclusion on a per interaction basis from the customer assessment and recognition process; one or more proffered spoken languages or language variants to be used on future interactions; etc. These preferences can be set by either using a Web application, native mobile application, or other GUI-based tool where the caller can express them explicitly outside the context of a call or via the speech application that includes preference questions in the call flow.

In one embodiment of the invention, a single cross-enterprise mechanism that is managed centrally via a Web portal is used to provide a customer experience that varies on many different incoming lines for anonymous customers. Variations that may be configured include playing of branding messages, announcement of delivery, primary interaction language, secondary language options for callers, menu options, association with a line of products or services, and identifying a task that the customer is expected to perform during interaction.

Figures 3A, 3B:
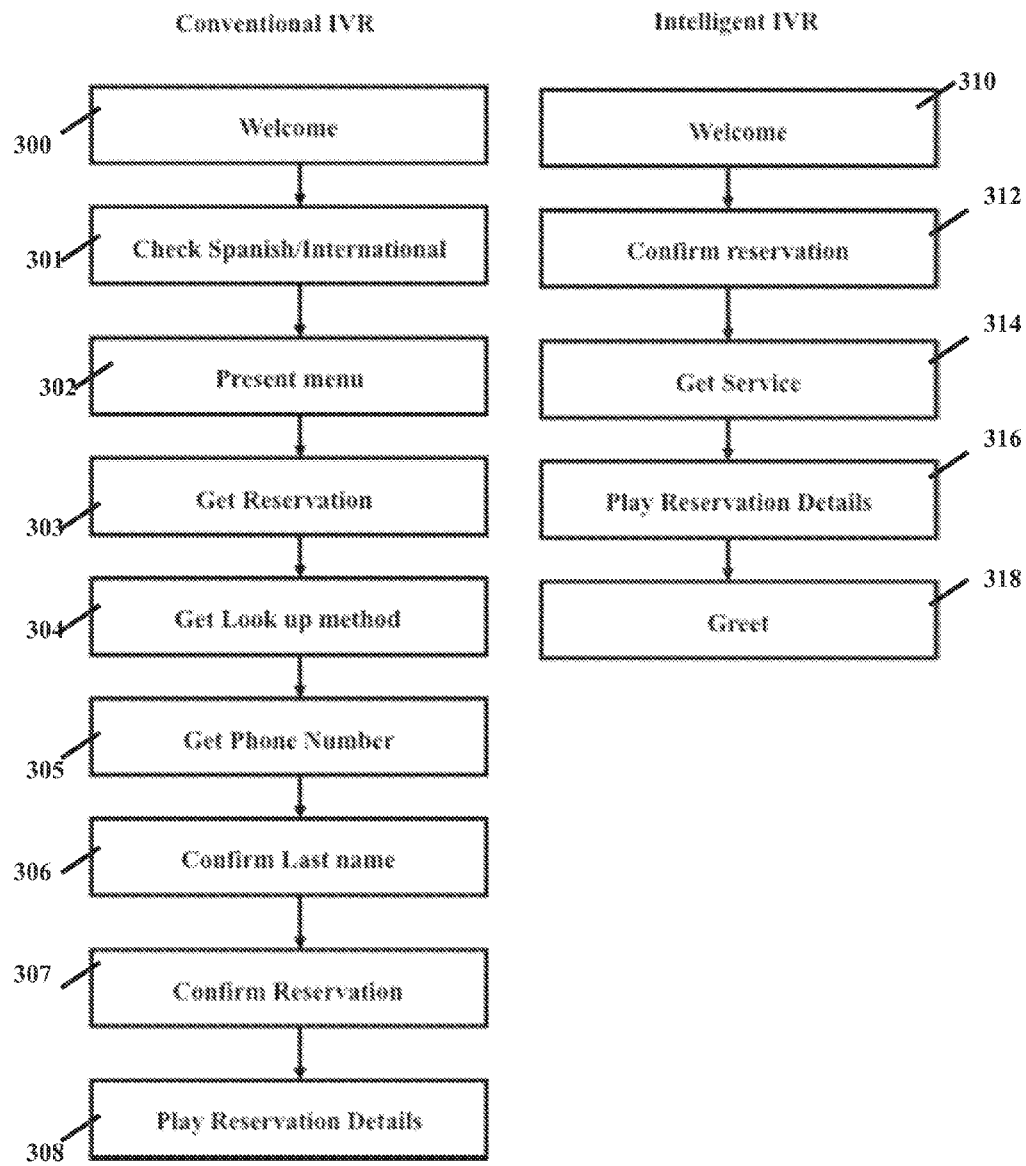
FIGS. 3A and 3B are flow diagrams that show a comparison between a conventional IVR system (FIG. 3A) and an intelligent IVR system according to the invention (FIG. 3B)

FIGS. 3A and 3B are flow diagrams that show a comparison between a conventional IVR system (FIG. 3A) and an intelligent IVR system according to the invention (FIG. 3B). The flow diagram shows an illustrative example and should not be considered to be limiting with regard to the scope of the invention. The comparison shows a general execution of personalized service strategy for each customer, which minimizes the duration of the interaction, and the cognitive effort needed by the customer during the call and the enhanced customer experience provided by an embodiment of the invention when compared to a conventional IVR system.

In a conventional IVR system, the customer is greeted (300) and then asked which language the customer wants to use when interacting with the system (301). A series of menus are then presented (302), from which customer selects the desired services. In the example shown in FIG. 3A, the desired services are related to the reservations that the customer has made (303). The system collects the tracking number from the customer, and then collects other details that may be used to look up the customer's information (304), such as the customer's phone number (305), and to validate the customer, such as the customer's last name (306). The system then confirms the reservations (307) and plays details to the customer (308).

In contrast thereto, the intelligent IVR greets the customer (310) and simultaneously identifies the customer and predicts the intent of the customer for this interaction. The system then confirms the reservation (312), gets the service (314), and plays the reservation to the customer (316). The use of confidence calculations, in effect, allows the intelligent IVR to make presumptions that a conventional IVR can not make due to its "one size fits all" approach. As a result, the intelligent IVR approach reduces both the time expended, perceived effort on the caller's part, and costs related to connection time for both the customer's telephony carrier and the toll-free carrier serving the enterprise that is supported by the intelligent IVR.

Computer Implementation

Figure 4:
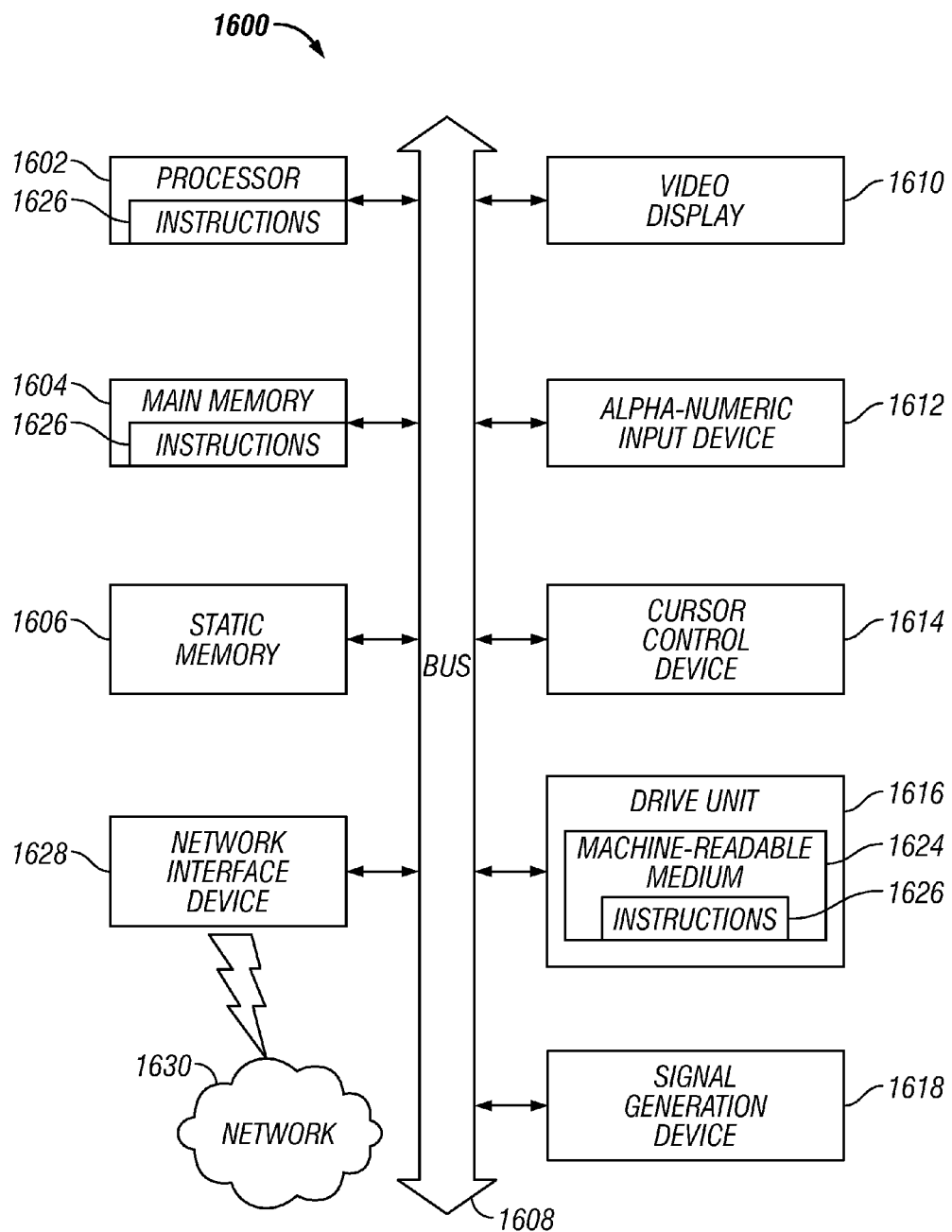
FIG. 4 is a block schematic diagram that depicts a machine in the exemplary form of a computer system within which a set of instructions for causing the machine to perform any of the herein disclosed methodologies may be executed.

FIG. 4 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604, and a static memory 1606, which communicate with each other via a bus 1608. The computer system 1600 may further include a display unit 1610, for example, a liquid crystal display (LCD). The computer system also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC). Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core, such as the CPU of a computer, or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for identifying a customer across a multichannel network and predicting customer intent, the method comprising:
   providing a processor implemented automated self-service application framework collecting data from:
   one or more sets of data that the framework persists;
   data persisted by a plurality of communication channels; and
   enterprise data that the framework accesses;
   determining an identity confidence score from the data using:
   history of previous interactions via a current interaction channel; and
   history of correlation between the current interaction channel and a plurality of other communication channels;
   using the identity confidence score and predicting an identity, or multiple possible candidate identities, of each customer; and
   performing performance self-monitoring by regularly calculating a customer assessment success rate that comprises a percentage of times a customer assessment is completed in its entirety before conclusion of an assessment period,
   where the assessment period denotes a maximum amount of time available at the start of a customer interaction before prediction results are no longer valuable.

2. The method of claim 1, further comprising:
using the identity and predicting the intent of the customer to determine an action or actions that the customer is going to take in an ongoing interaction.

3. The method of claim 1, further comprising:
self-optimizing the identity confidence score by adjusting the identity confidence score after each interaction.

4. The method of claim 1, further comprising:
determining the identity confidence score using a history of the customer identification success rate, which comprises a percentage of times a customer identification is successfully completed in its entirety before conclusion of an identification period, where the identification period denotes a maximum amount of time available at the start of a customer interaction before identification prediction results are no longer valuable.

5. The method of claim 1, further comprising:
determining the identity confidence score using customer's explicit opt-in actions.

6. The method of claim 1, wherein the identity comprises:
at least one name for the contacting person;
a plurality of actions; or
one or more of different languages, regions, products, and departments.

7. The method of claim 6, wherein the actions further comprise:
actions previously taken via the current interaction channel; and
actions previously taken via the other communication channels that are associated to the same name.

8. The method of claim 1, further comprising:
when an identity confidence score is low and ambiguity exists about a customer's identity, asking the customer about the customer's identity directly; and
when an identity confidence score is high, guessing a customer's identity and confirming the customer's identity based upon the customer's response to the guess.

9. The method of claim 1, further comprising:
updating the data that the framework persists, by including contents of the current interaction, the contents comprising:
successfulness of identity prediction;
successfulness of intent prediction;
actual identity and initial intent of the customer;
the actions that the customer took in the current interaction; and
adjustment on the identity of the customer in the other communication channels.

10. The method of claim 1, further comprising:
predicting the customer intent using a history of customer's interactions via the current interaction channel.

11. The method of claim 1, further comprising:
determining the customer intent using the customer's recent transactions and activities, life style, and investments.

12. The method of claim 1, further comprising:
predicting the customer intent using history of correlation between the current interaction channel and the other communication channels, and the history of actions that the customer has done via each channel.

13. An apparatus for identifying a customer across multiple channels and predicting customer intent, comprising:
a customer care center in communication with a customer via a multichannel communication network;
wherein the customer comprises one of multiple customers who interact with said customer care center, each of which has a specific intention to receive a desired service or information;
the customer care center comprising an expert service portal (ESP) collecting data from:
any data that the customer care center persists;
data persisted by a plurality of communication channels; and
any enterprise data that the customer care center accesses;
the customer care center determining an identity confidence score using:
history of previous interactions via a current interaction channel; and
history of correlation between the current interaction channel and a plurality of other communication channels;
the customer care center predicting the identity, or multiple possible candidate identities, of each customer; and
the customer care center allowing the customer to set certain preferences for a customer assessment on identification and intent prediction, the preferences comprising:
a plurality of preferred actions from a certain set of actions;
permanent opt-in to and/or opt-out of prediction process; and
temporary exclusion on a per-interaction basis from the prediction process;
wherein the customer sets the certain preferences via a variety of communication channels.

14. The apparatus of claim 13, further comprising:
said customer care center predicting the intent of said customer's interaction upon receiving confirmation of said customer's identity; and
said customer care center estimating an action or actions that the customer intends to take in an ongoing interaction based upon said predicted customer's intent.

15. The apparatus of claim 13, further comprising:
the customer care center performing performance self-monitoring by regularly calculating a customer assessment success rate which comprises a percentage of times a customer assessment is completed in its entirety before conclusion of an assessment period, where the assessment period denotes a maximum amount of time available at the start of a customer interaction before prediction results are no longer valuable.

16. The apparatus of claim 13, the customer care center further comprising:
a real-time caller assessment framework, a customer interaction database for augmenting customer data repositories, interaction capture services, and a prediction model refinement mechanism each of which, alone or in combination, is used to identify said customer, predict customer intention, calculate propensities for specific customer behaviors to be successfully elicited, and minimize duration of customer interaction with said system.

17. The apparatus of claim 13, the customer care center further comprising:
a greeting module for welcoming said customer and simultaneously identifying said customer.

18. The apparatus of claim 13, the customer care center further comprising:
an identity confidence scoring mechanism for developing and managing a storage mechanism in a customer interaction database that contains unrestricted, many-to-many relationships between different communication channels, the identity confidence scoring mechanism correlating a name with an ID to evolve on a continuous or discrete scale, using inputs observed by the system.

19. The apparatus of claim 13, further comprising:
the identity confidence scoring mechanism addressing identifications that are shared by multiple customers by using parallel scoring and assessment of multiple customer IDs for an interaction, and by selectively applying either an interactive disambiguation process or a sense of a personalized interaction with multiple identities under approved conditions.

20. The apparatus of claim 13, the customer care center further comprising:
an intent prediction module for predicting said customer intent; and
a prediction validation module for validating predictions from said intent prediction module.

21. The apparatus of claim 13, the ESP further comprising:
an intent prediction module configured to use multiple data sources to contribute to prediction of customer intent for a current interaction, wherein the data sources comprise sources that the ESP can access, and have information regarding past interactions via variety of communication channels.

22. The apparatus of claim 12, the customer care center further adjusting on-the-fly and learning which identity and intent assessment can be productively applied to the customer.

23. A computer-implemented method for identifying a customer across a multichannel network and predicting customer intent, the method comprising:
providing a processor implemented automated self-service application framework collecting data from:
one or more sets of data that the framework persists;
data persisted by a plurality of communication channels; and
enterprise data that the framework accesses;
determining an identity confidence score from the data using:
history of previous interactions via a current interaction channel;
history of correlation between the current interaction channel and a plurality of other communication channels; and
history of a customer identification success rate, which comprises a percentage of times a customer identification is successfully completed in its entirety before conclusion of an identification period, where the identification period denotes a maximum amount of time available at the start of a customer interaction before identification prediction results are no longer valuable; and
using the identity confidence score and predicting an identity, or multiple possible candidate identities, of each customer.

* * * * *